(12) United States Patent
Sousa et al.

(10) Patent No.: US 12,564,259 B2
(45) Date of Patent: Mar. 3, 2026

(54) BRUSH FOR APPLYING A CLEANSING POWDER

(71) Applicant: KAS PET, LLC, Bellmore, NY (US)

(72) Inventors: Mark Sousa, Hope, RI (US); Lindsay Joyce, Bellmore, NY (US)

(73) Assignee: KAS PET, LLC, Bellmore, NY (US)

( * ) Notice: Subject to any disclaimer, the term of this patent is extended or adjusted under 35 U.S.C. 154(b) by 73 days.

(21) Appl. No.: 18/751,857

(22) Filed: Jun. 24, 2024

(65) Prior Publication Data

US 2024/0423354 A1     Dec. 26, 2024

Related U.S. Application Data

(60) Provisional application No. 63/509,849, filed on Jun. 23, 2023.

(51) Int. Cl.
*A46B 11/00* (2006.01)
*A01K 13/00* (2006.01)
(Continued)

(52) U.S. Cl.
CPC ........ *A46B 11/0013* (2013.01); *A01K 13/001* (2013.01); *A45D 19/026* (2021.01);
(Continued)

(58) Field of Classification Search
CPC ... A46B 11/00; A46B 11/001; A46B 11/0013; A46B 11/0062; A46B 11/0068; A46B 11/0082; A46B 15/0026; A46B 15/0081; A46B 2200/10; A46B 2200/104; A46B 2200/1046; A46B 2200/1093; A46B 2200/20; A46B 17/00; A46B 17/04; A46B 5/02; A46B 5/021; A46B 5/023; A46B 5/025; A46B 5/0095; A45D 19/00; A45D 19/026; A45D 24/22; A45D 33/006; A45D 33/02; A45D 33/025; A45D 33/06;
(Continued)

(56) References Cited

U.S. PATENT DOCUMENTS

| | | | |
|---|---|---|---|
| 9,204,704 B1 * | 12/2015 | Wolfe | ................ A46B 11/0058 |
| 11,957,238 B1 * | 4/2024 | Beecher | ............. A46B 11/0013 |

(Continued)

*Primary Examiner* — Rachel R Steitz
*Assistant Examiner* — Karim Asqiriba
(74) *Attorney, Agent, or Firm* — Day Pitney LLP; George Chaclas; Anthony A. Kassas

(57) ABSTRACT

A brush for applying a cleansing compound with an inner body having a tube portion with outer proximal threads. The tube portion has an opening for filling the tube portion with the cleansing compound and an enclosed bottom having a central guide tooth receptacle and a plurality of discharge holes. The brush has a brush portion including a plate having at least one upstanding standoff, a central guide tooth, and a plurality of depending bristles. The plate has a plurality of dispensing holes and an upstanding collar configured to secure the plate against the enclosed bottom of the inner body. The central guide tooth fits into the central guide tooth receptacle to guide rotation of the brush portion with respect to the inner body. In an open position, the plurality of discharge and dispensing holes are aligned so that the cleansing compound passes into the plurality of depending bristles.

19 Claims, 10 Drawing Sheets

(51) Int. Cl.

| | |
|---|---|
| *A45D 19/02* | (2006.01) |
| *A46B 5/00* | (2006.01) |
| *A46B 5/02* | (2006.01) |
| *A46B 17/04* | (2006.01) |

(52) U.S. Cl.
CPC .............. *A46B 5/0095* (2013.01); *A46B 5/02*
(2013.01); *A46B 11/0062* (2013.01); *A46B*
*17/04* (2013.01); *A46B 2200/1093* (2013.01)

(58) Field of Classification Search
CPC ........ A45D 33/10; A45D 33/08; A45D 33/36;
A45D 33/042; A01K 13/00; A01K
13/001; A01K 13/002
USPC ...................................................... 222/142.1
See application file for complete search history.

(56) References Cited

U.S. PATENT DOCUMENTS

| | | | | |
|---|---|---|---|---|
| 2009/0180825 A1* | 7/2009 | Chang | ................ | A46B 11/0013 |
| | | | | 401/129 |
| 2017/0295903 A1* | 10/2017 | Coffee | ................... | A45D 24/22 |
| 2018/0110202 A1* | 4/2018 | Michael | ............... | A01K 13/002 |
| 2018/0184783 A1* | 7/2018 | Cheng | ................... | A45D 33/02 |
| 2021/0045521 A1* | 2/2021 | Goldberg | ............... | A46B 7/042 |
| 2024/0341445 A1* | 10/2024 | Mastrianna | ........ | A46B 11/0041 |

* cited by examiner

1000

104
116H
108
120
116A
116G
100
114
112
111
116B
116F
110
106
116C 116D
116E 220
224
200
222
226
232
230
227
216
300
306
322
316
302

400

BRUSH FOR APPLYING A CLEANSING POWDER

CROSS-REFERENCE TO RELATED APPLICATIONS

This application claims the benefit and priority of U.S. Provisional Patent Application No. 63/509,849, entitled BRUSH FOR APPLYING A CLEANSING POWDER and filed on Jun. 23, 2023, the entirety of which is incorporated by reference for any purpose whatsoever.

FIELD OF THE DISCLOSURE

The subject disclosure relates generally to the field of pet grooming products and more specifically to applicators and brushes designed for the application of dry shampoo to animals. This includes tools and devices that facilitate the efficient and even distribution of shampoo formulations through the fur of various pets, such as cats and dogs. The disclosed applicators and brushes aim to enhance the grooming process by providing improved control, ease of use, and effectiveness in maintaining the hygiene and appearance of pets.

BACKGROUND

The grooming and maintenance of pets, particularly cats and dogs, is a significant concern for pet owners. Regular grooming is essential for maintaining the health and hygiene of pets, contributing to their overall well-being. Traditional grooming methods often include bathing with water and shampoo, which can be stressful and inconvenient for both the pet and the owner. In response to these challenges, dry shampoos have emerged as a popular alternative for pet grooming.

Dry shampoos are formulated to clean and deodorize the pet's coat without the need for water. These products typically come in powder or spray forms and work by absorbing excess oils and dirt from the fur. While dry shampoos offer convenience, the application process can be cumbersome and inefficient. Proper distribution of the product through the pet's fur is crucial for its effectiveness, and this requires appropriate applicators and brushes.

Existing applicators and brushes designed for applying dry shampoo to pets vary in their design and functionality.

However, many of these existing tools present several limitations. For instance, some applicators do not effectively control the amount of dry shampoo dispensed, leading to either an insufficient or excessive application. Additionally, the distribution of the product through the fur can be uneven, particularly in animals with dense or long coats. This uneven application can result in areas that remain dirty or overly treated, affecting the overall grooming quality.

Another challenge with current dry shampoo applicators and brushes is their ease of use. Pet owners often find it difficult to manage the applicator while ensuring their pet remains calm and cooperative during grooming. Ergonomics and ease of handling are critical factors that influence the effectiveness of the grooming session. Many existing products do not adequately address these ergonomic concerns, leading to a less efficient and more stressful grooming experience.

Thus, while dry shampoos provide a valuable alternative to traditional pet bathing, the applicators and brushes available on the market have several shortcomings that affect their effectiveness and ease of use. There is a clear need for innovative designs that offer better control, even distribution, and ease of handling, tailored to the specific needs of different pets. Addressing these issues will significantly enhance the grooming experience for both pets and their owners, ensuring improved hygiene and well-being for the animals.

SUMMARY

Embodiments of the present application include a brush for applying a cleansing compound. The brush has an inner body having: a tube portion with outer proximal threads, an outer distal flange, and outer distal radial fins extending between the tube portion and outer distal flange, the tube portion defining a proximal opening for filling the tube portion with the cleansing compound; and an enclosed bottom having a central guide tooth receptacle and defining a plurality of discharge holes. The brush also has a proximal cover for enclosing the proximal opening, the proximal cover including a handle and inner threads for coupling to the outer proximal threads of the tube portion. Further, the brush has a brush portion including: a plate having at least one upstanding standoff, a central guide tooth, and a plurality of depending bristles, the plate defining a plurality of dispensing holes; and an upstanding collar configured to secure the plate against the enclosed bottom of the inner body.

The central guide tooth fits into the central guide tooth receptacle to allow and guide rotation of the brush portion with respect to the inner body so that in a closed position, the plurality of discharge and dispensing holes are not aligned so that the cleansing compound is retained in the inner body. In an open position, the plurality of discharge and dispensing holes are aligned so that the cleansing compound passes into the plurality of depending bristles. The at least one upstanding standoff limits rotational travel by banking between the radial fins.

In other embodiments, the inner body further may define at least one pair of detent depressions, and the brush portion further has at least one locating rib. In the closed position, the at least one locating rib may be a first detent of the at least one pair of detent depressions. In the open position, the at least one locating rib may be in a second detent of the at least one pair of detent depressions. Further, the at least one upstanding standoff may limit rotational travel by banking between two radial fins separated from each other by $\pi/2$ radians with respect to the tube portion.

In other embodiments, the brush may include a distal cap for selectively coupling to the brush portion, wherein the plate includes a distal magnet and the distal cap includes post having a proximal magnet so that the magnets couple to retain the brush portion and distal cap together.

Embodiments of the present application include a grooming device having an inner body with a tube portion with outer proximal threads. The tube portion has a proximal opening for filling the tube portion with the cleansing powder, and an enclosed bottom having a central guide tooth receptacle and defining at least one pair of detent depressions and a plurality of discharge holes. The grooming device has a proximal cover for enclosing the proximal opening, the proximal cover including a handle and inner threads for coupling to the outer proximal threads of the tube portion. The grooming device also has a plate with a central guide tooth, at least one locating rib, and a plurality of depending bristles. The plate has a plurality of dispensing holes, and an upstanding collar configured to secure the plate against the enclosed bottom of the inner body by coupling to the flange.

The central guide tooth fits into the central guide tooth receptacle to allow and guide rotation of the plate with respect to the inner body so that in a closed position, the at least one locating rib is in a first detent of the at least one pair of detent depressions and the plurality of discharge and dispensing holes are not aligned so that the cleansing powder is retained in the inner body. In an open position, the at least one locating rib is in a second detent of the at least one pair of detent depressions and the plurality of discharge and dispensing holes are aligned so that the cleansing powder passes into the plurality of depending bristles.

In other embodiments, the plate may further define at least one upstanding standoff, and the inner body further has an outer distal flange and outer distal radial fins extending between the tube portion and outer distal flange. The at least one upstanding standoff may limit rotational travel by banking between the radial fins. Further, the at least one upstanding standoff may limit rotational travel by banking between two radial fins separated from each other by $\pi/2$ radians with respect to the tube portion.

Embodiments of the present application include a grooming device having a proximate cover with a handle. The grooming device also has an inner body configured to be removably attached to the proximate cover, the inner body having at least one stand off limit and defining at least one discharge hole. The grooming device also has a brush configured to snap on to the inner body and rotate about the inner body. The brush has a plurality of depending projections and at least one dispensing hole creating a passage through the brush. The at least one stand off limit the rotation of the brush around the inner body. When the grooming device is in an open position, the at least one discharge hole overlaps with the at least one dispense hole. When the grooming device is in a closed position, the at least one discharge hole does not overlap with the at least one dispense hole.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

The advantages, and features of the technology disclosed herein, will become more readily apparent to those having ordinary skill in the art from the following detailed description of certain preferred embodiments taken in conjunction with the drawings which set forth representative embodiments of the present technology.

DETAILED DESCRIPTION

Figure 1:
FIG. 1 shows a front, perspective view of a grooming device in accordance with the subject technology.
Figure 1:
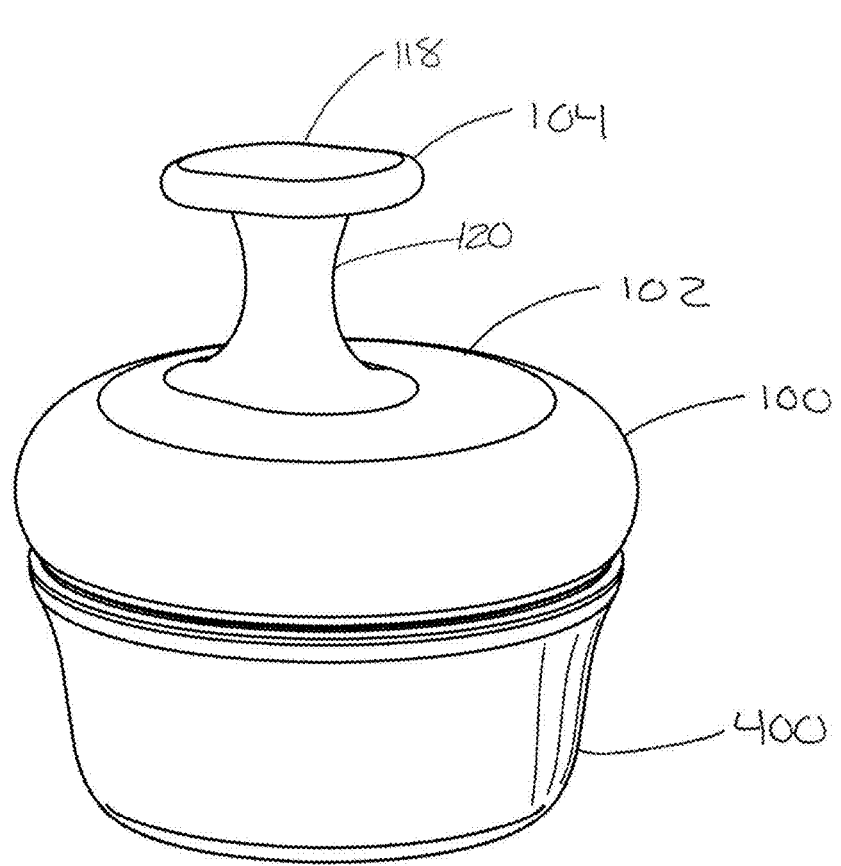

The subject technology overcomes many of the prior art problems associated with grooming devices and brushes. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as top, bottom, proximal, distal, vertical, horizontal, upward, downward, right, left and the like, are used with respect to the figures and not meant in a limiting manner.

Figure 2:
FIG. 2 shows a front, perspective view of the grooming device of FIG. 1, with an applicator cap removed, exposing a brush in accordance with the subject technology.
Figure 2:
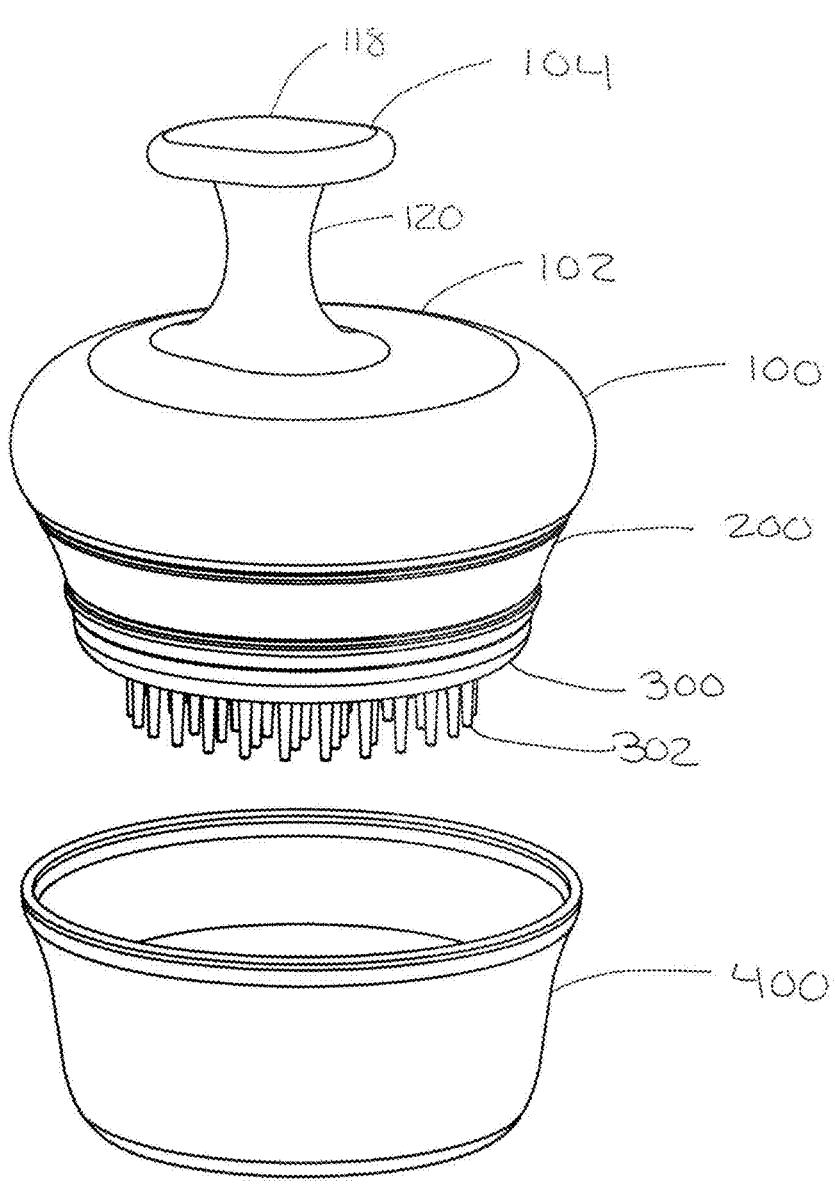

Referring now to FIGS. 1-2, a grooming device 1000 is shown from a front, perspective view in accordance with the subject technology. The grooming device 1000 includes a proximal cover 100 forming a vaulted dome shape with a level top surface 102. The proximal cover 100 has a handle 104 defining a pommel 118 with a shape complementary to the palm of a hand. The handle 104 may be integrally formed, or attached to the level top surface 102 via a neck 120 for applying torque or normal force to the proximal cover 100 in separating the cover 100 from an inner body 200 of the grooming device 1000. The inner body 200 of the grooming device 1000 is mated with a brush portion 300 having a plurality of depending bristles 302. The grooming device 1000 also incorporates a distal cap 400 for selectively coupling to the brush portion 300.

The grooming device 1000 is designed to hold and dispense dry shampoo powder using a built-in reservoir that is filled with dry shampoo powder. The powder is selectively released from apertures 216, 316 adjacent the depending bristles 302. As hair is brushed, the dry shampoo powder is evenly distributed through the bristles 302 and onto the skin and hair. This ensures a deeper, more uniform application compared to sprinkling the powder directly onto the hair. Brushing the dry shampoo through hair can also add volume and texture, as the powder helps lift roots and add body. After applying the dry shampoo, apertures 316 can be closed so that the grooming device 1000 can be used to continue brushing to remove excess powder, ensuring the powder is well-blended without leaving visible residue.

The manner by which the grooming device 1000 contains and distributes the cleansing powder is contemplated with reference to the remaining drawings.

Figure 3:
FIG. 3 shows an exploded, top perspective view of the grooming device of FIG. 1 in accordance with the subject technology.
Figure 4:
FIG. 4 shows a second, exploded, top perspective view of the grooming device of FIG. 1 in accordance with the subject technology.
Figure 4:
Figure 4:
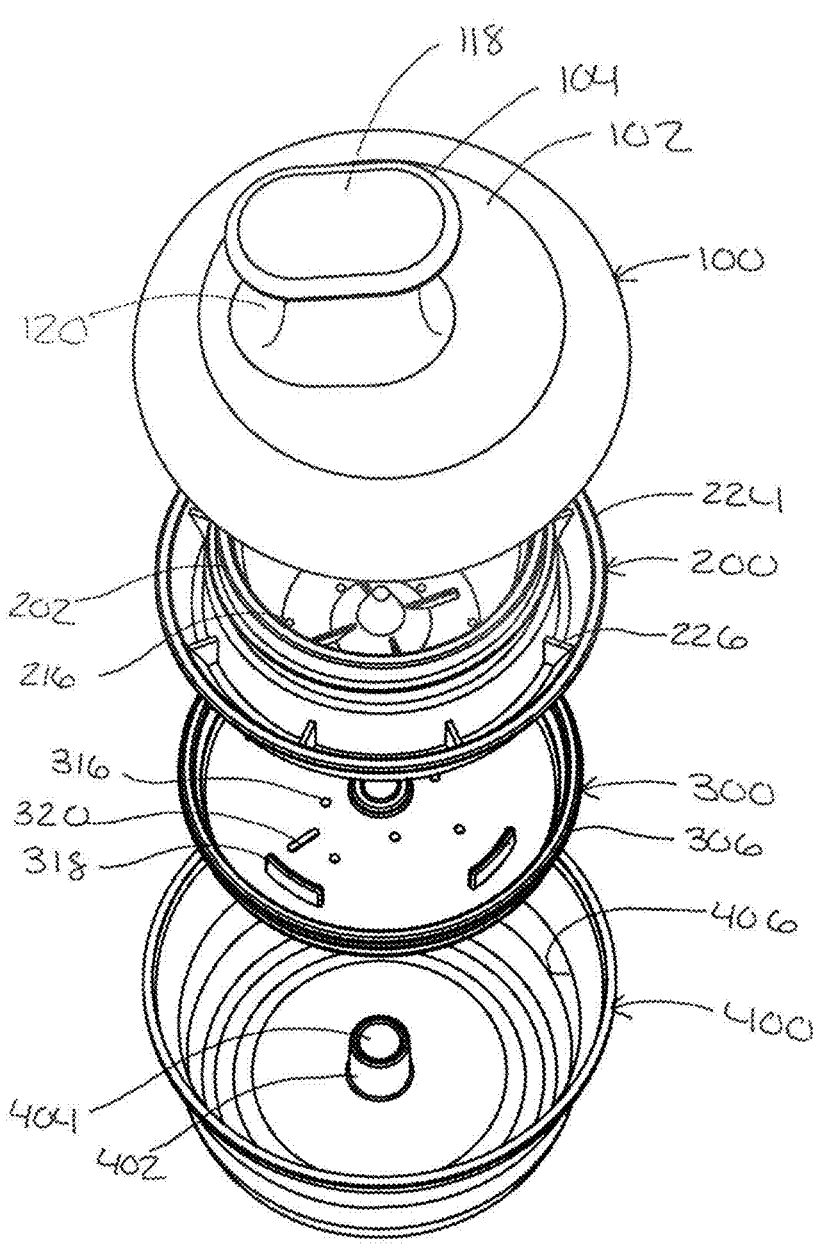
Figure 5:
FIG. 5 shows an exploded, bottom perspective view of the grooming device of FIG. 1 in accordance with the subject technology.

Referring now to FIGS. 3-5, various exploded views of the grooming device 1000 are depicted, selectively including each of the proximal cover 100, inner body 200, brush portion 300, and distal cap 400 introduced above. Beginning with the aforementioned proximal cover 100, and as best shown in FIG. 5, within an interior 106 of the vaulted dome shape thereof and opposite the level top surface 102, the proximal cover 100 has an inner tube 108 with interior threads 110. The inner tube 108 further has an inner tube exterior sidewall 111. The proximal cover 100 also has a proximal cover perimeter sidewall 112 radially spaced from the inner tube exterior sidewall 110 such that the inner tube 108 and proximal cover perimeter sidewall 112 define concentric circles in plan view. A plurality of radial spokes 114 connect the inner tube exterior sidewall 110 with the proximal cover perimeter sidewall 112, compartmentalizing the areas 116A-H between the inner tube exterior sidewall 110 and the proximal cover perimeter sidewall 112. However, in alternative embodiments, the radial spokes 114 may not be present, and thus the areas 116A-H can be integral and open, or solid filled.

Figures 6A, 6B, 6C:
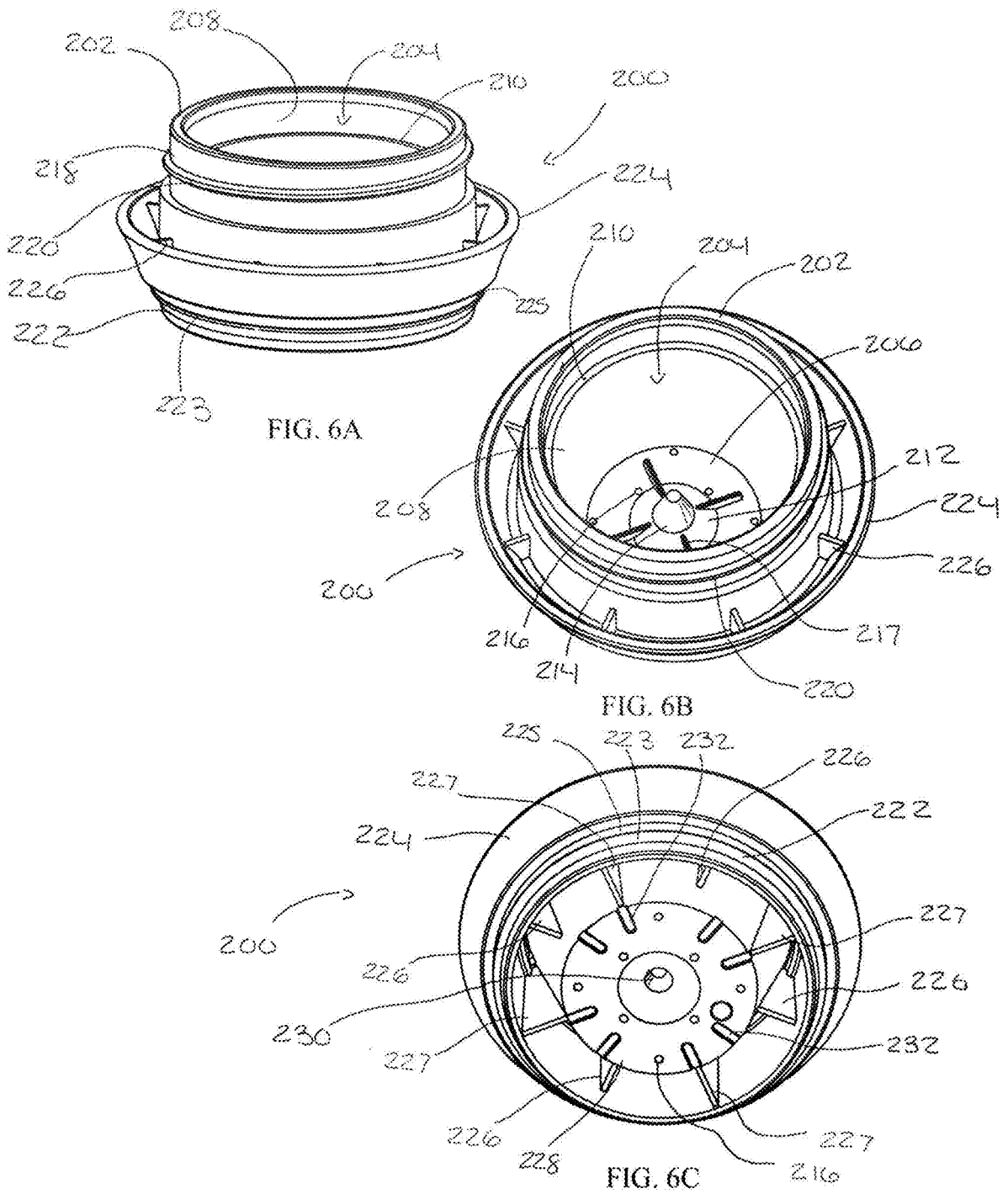
FIGS. 6A-6C show a front perspective, top perspective, and bottom perspective view, respectively, of an isolated inner body portion of the grooming device of FIG. 1 in accordance with the subject technology.

Referring to FIGS. 6A-6C, the inner body 200 of the grooming device 1000 is represented in several perspective views. The inner body 200 has an inner body tube portion 202 with a proximal opening 204 for filling the tube portion 202 with a cleansing compound or the like when the proximal cover 100 is dissociated therewith. In this regard, the inner body tube portion 202 has an enclosed bottom 206 and upstanding inner body internal sidewalls 208 forming the tube portion 202. The internal sidewalls 208 define a ridge 210 between the opening 204 and the enclosed bottom 206, though otherwise, the sidewalls 208 are relatively smooth.

Figure 9A:
FIGS. 9A and 9B show cross-sectional, perspective views of the grooming device of FIG. 1 in the aforementioned closed and open position, respectively, cut along line 8-8 indicated in FIG. 8, in accordance with the subject technology.
Figure 9B:

The upstanding inner body internal sidewalls 208 slope radially inward between the ridge 210 and the enclosed bottom 206, as best shown in FIGS. 6A-6B and 9A-9B. The radial sloping enables the upstanding inner body internal sidewalls 208 to avoid contacting the upstanding standoffs 318 as best shown in FIG. 9B. The radial sloping of the internal sidewalls 208 also funnels dry shampoo compound towards the enclosed bottom 206. The enclosed bottom 206 has a raised circular platform 212 in the center thereof, the raised circular platform 212 having centered thereon a conical cap 214. The enclosed bottom 206 further has a plurality of discharge holes 216 for the dispersion of the cleansing compound therethrough, and a plurality of radial vanes 217 for structural support.

Opposite the inner body internal sidewalls 208, inner body exterior sidewalls 218 define upper outer proximal threads 220 for fastening with the proximal cover 100 inner tube 108. The inner body exterior sidewalls 218 also have a lower outer connection surface 222 for snap fitting with the aforementioned brush portion 300. The lower outer connection surface 222 defines a ring 223 with an annular capture groove 225, but alternatively may including threading or similar connective surfacing.

Extending from the inner body exterior sidewalls 218 is an outer distal flange 224 propagating conically therefrom. The outer distal flange 224 generally separates the set of upper outer proximal threads 220 and the lower outer connection surface 222.

Outer distal radial fins 226, 227 are disposed between the inner body exterior sidewalls 218 and the outer distal flange 224. Due to the nature of the conical propagation of the distal flange 224, the outer distal radial fins 226, 227 respectively have a variable width in order to maintain connection between the inner body exterior sidewalls 218 and the outer distal flange 224.

Further, as shown in FIG. 6C, the outer distal radial fins 226, 227 are variable in height. As labeled, four of the outer distal radial fins 226 have a medial height, while another four of the outer distal radial fins 227 have a full length height. The arrangement of the outer distal radial fins 226, 227 alternates circumferentially between an outer distal radial fin 226 having a medial height and an outer distal radial fin 227 having a full length height, an outer distal radial fin 226 disposed equidistant, such as every π/4 radians, relative to the tube portion 202. It's worth noting that there may be a variable number of outer distal radial fins 226, 227, and embodiments discussed herein should not limited in this regard.

Still referring specifically to FIG. 6C, the distal surface 228 of the enclosed bottom 206 is illustrated. The plurality of discharge holes 216 extend through the enclosed bottom 206. Further, opposite the conical cap 214 is a central guide tooth receptacle 230 taking the opposite shape of the conical cap 214. The distal surface 228 of the enclosed bottom 206 also has a plurality of detent depressions 232. The detent depressions 232 are aligned in four pairs, a first detent depression of each pair disposed opposite the central guide tooth receptacle 230 as a second detent depression of each pair.

Figures 7A, 7B, 7C:
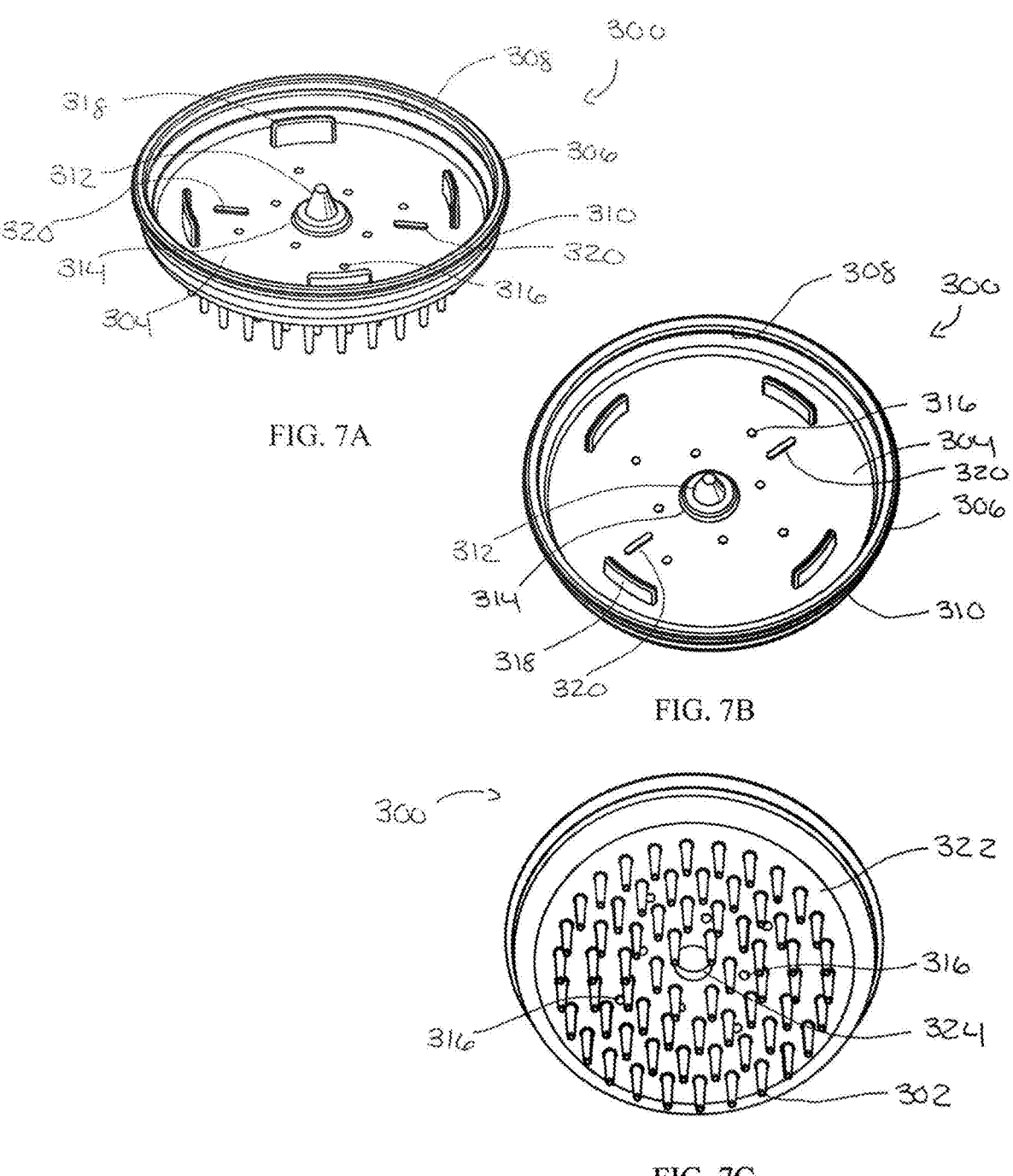
FIGS. 7A-7C show a front perspective, top perspective, and bottom perspective view, respectively, of an isolated brush portion of the grooming device of FIG. 1 in accordance with the subject technology.

Turning now to FIGS. 7A-7C, isolated views of the brush portion 300 of the grooming device 1000 are shown. The brush portion 300 has a round plate 304, with an upstanding collar 306 circumferentially disposed. The upstanding collar 306 has a connection surface 308 complimentary in shape as the lower outer connection surface 222 of the inner body 200 for snap fitting with the lower outer connection surface 222 and enabling rotation upon connection. Though, as mentioned previously, the upstanding collar 306 and lower outer connection surface 222 may be threaded together or similarly connected by other means. The upstanding collar 306 similarly has exterior threading 310 for mating with a distal cap 400, described below.

Further to the upstanding collar 306, the brush portion 300 also has a central guide tooth 312 centrally aligned on the plate 304, the central guide tooth 312 emerging out of an elevated, stepped, platform 314. The central guide tooth 312 forms an inverted cone shape, and is configured for receipt in the central guide tooth receptacle 230 of the inner body 200 of the grooming device 1000. When received in the central guide tooth receptacle 230, the central guide tooth 312 allows and guides rotation of the brush portion 300 with respect to the inner body 200.

A plurality of dispensing holes 316 are radially disbursed around the central guide tooth 312 and platform 314, the dispensing holes 316 extending through the plate 304 for the dispersion of the cleansing compound therethrough. The quantity of dispensing holes 316 or discharge holes 216 in the brush portion 300 or inner body 200 can vary embodiment to embodiment. The plate 304 also has a plurality of upstanding standoffs 318 orbitally arrayed around the central guide tooth 312 of the platform 314. The upstanding standoffs 318 are arcuate in shape, resembling segments of a circle, and aligned in pairs, an upstanding standoff 318 of each pair disposed opposite the central guide tooth 312 as a second upstanding standoff 318 of each pair.

Further, two locating ribs 320 are aligned on opposite sides of the central guide tooth 312 and extend radially outward, the locating ribs 320 shorter in height than the upstanding standoffs 318, that is, in a plane orthogonal to a plane of the plate 304. The two locating ribs 320 are configured for sheltering in any of the pairs of the detent depressions 232 of the inner body 200 in order to align the brush portion 300 with the inner body 200. When rotating the brush portion 300 relative to the inner body 200, the locating ribs 320, cam against the detent depressions 232 and the locating ribs 320, and/or the detent depressions 232 plastically deform, thus still enabling rotation.

Opposite the central guide tooth 312, upstanding standoffs 318, and locating ribs 320, a plurality of bristles 302 depend from an underside 322 of the plate 304 as shown best in FIGS. 7C and 9A. Defined also by the underside 322 of the plate 304 is a centrally disposed magnet housing 324.

The centrally disposed magnet housing 324 is used for centrally housing a brush portion magnet 326 as shown in cross-section in FIGS. 9A-9B. The distal cap 400, as pictured in FIG. 4, also has a central post 402 having a cap magnet 404 so that the brush portion magnet 326 and cap magnet 404 couple to retain the brush portion 300 and distal cap 400 together. The distal cap 400, as pictured in FIG. 4 generally has a truncated funnel shape, and further has internal cap threading 406 for further securement to the brush portion 300 collar 306 exterior threading 310.

Referring back to FIGS. 3-5, to assemble the grooming device 1000, the proximal cover 100 is first secured to the inner body 200 via the inner tube 108 interior threads 110 and the tube portion 202 upper outer proximal threads 220. Subsequently, the central guide tooth 312 of the brush portion 300 is inserted into the central guide tooth receptacle 230 of the inner body 200, and the connection surface 308 of the upstanding collar 306 is snap fit secured with the lower outer connection surface 222 of the inner body 200. To cap the grooming device 1000, the internal cap threading 406 is secured to the brush portion 300 collar 306 exterior threading 310 and further or alternatively held together via bringing into proximity the brush portion magnet 326 and cap magnet 404.

Figure 8:
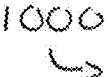
FIG. 8 shows a front, perspective view of the grooming device of FIG. 1, with an indicator symbol depicting how to actuate the device between a closed and open position in accordance with the subject technology.

Referring now to FIG. 8-9B, the progression between open and closed positions of the grooming device 1000 is contemplated. Beginning with FIG. 9A, the grooming device 1000 is shown in cross-section in a closed position. The locating ribs 320, of the brush portion 300 are locking the grooming device 1000 in the closed position as they align in a pair of detent depressions 232 of the inner body 200. Further, in the closed position, the plurality of discharge holes 216 of the inner body 200 are misaligned with the plurality of dispensing holes 316 of the brush portion 300 such that cleansing compound held in the inner body tube portion 202 cannot propagate through the enclosed bottom 206 and through the plate of the brush portion 300.

The brush portion 300 is rotatable relative to the inner body 200 due to their snap fit connectivity. Thus, upon torqueing the brush portion 300 relative to the inner body 200 and proximal cover 100, such as shown in FIG. 8, the locating ribs 320 of the brush portion 300 cam against the detent depressions 232 of the inner body 200, and the locating ribs 320 and/or the detent depressions 232 plastically deform and release from aligning, thus enabling rotation. The central guide tooth 312 positioned in the central guide tooth 312 generally directs the rotation and ensures the brush portion 300 remains axially aligned with the inner body 200.

As shown in FIG. 9B, upon rotating the brush portion 300 roughly π/4 radians relative to the tube portion 202, the locating ribs 320 realign in a second pair of detent depressions 232. Upon this second alignment, the plurality of discharge holes 216 of the inner body 200 are aligned with the plurality of dispensing holes 316 of the brush portion 300, enabling the cleansing compound held in the inner body tube portion 202 to propagate through the enclosed bottom 206 and through the plate of the brush portion 300 for application and agitation by the depending bristles 302.

A user can further rotate the brush portion 300 roughly π/4 radians in the opposite direction to realign the locating ribs 320 in the first pair of detent depressions 232 and again misalign the plurality of discharge holes 216 of the inner body 200 with the plurality of dispensing holes 316 of the brush portion 300, closing the grooming device 1000.

The upstanding standoffs 318 of the brush portion 300 limit further rotational travel by banking between two sequential full length outer distal radial fins 227 of the inner body 200. Two sequential full length outer distal radial fins 227 of the inner body 200 are generally separated from each other by π/2 radians with respect to the tube portion 202.

It is envisioned that many features of the disclosed technology are optional. For example, the travel limit standoffs and radial fins may be omitted. Similarly, the guide tooth and receptacle may be omitted. The shape, number and arrangement of the components can also be varied and still utilize the subject technology. Similarly, although most of the components are expected to be made of plastic, any suitable material may be utilized. For example, all or a portion of the proximal cover may be flexible rubber to allow providing manual force to aid in dispensing the cleansing compound It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A brush for applying a cleansing compound, the brush comprising:

an inner body having: a tube portion with outer proximal threads, an outer distal flange, and outer distal radial fins extending between the tube portion and outer distal flange, the tube portion defining a proximal opening for filling the tube portion with the cleansing compound; and an enclosed bottom having a central guide tooth receptacle and defining a plurality of discharge holes;

a proximal cover for enclosing the proximal opening, the proximal cover including a handle and inner threads for coupling to the outer proximal threads of the tube portion; and a brush portion including: a plate having at least one upstanding standoff, a central guide tooth, and a plurality of bristles, the plate defining a plurality of dispensing holes; and an upstanding collar configured to secure the plate against the enclosed bottom of the inner body, wherein the central guide tooth fits into the central guide tooth receptacle to allow and guide rotation of the brush portion with respect to the inner body so that:

in a closed position, the plurality of discharge and dispensing holes are not aligned so that the cleansing compound is retained in the inner body;

in an open position, the plurality of discharge and dispensing holes are aligned so that the cleansing compound passes into the plurality of bristles; and the at least one upstanding standoff limits rotational travel by banking between the radial fins.

2. The brush of claim 1, wherein the inner body further has at least one pair of detent depressions, and the brush portion further has at least one locating rib.

3. The brush of claim 2, wherein in the closed position, the at least one locating rib is in a first detent of the at least one pair of detent depressions.

4. The brush of claim 2, wherein in the open position, the at least one locating rib is in a second detent of the at least one pair of detent depressions.

5. The brush of claim 1, further comprising a distal cap for selectively coupling to the brush portion, wherein the plate includes a distal magnet and the distal cap includes post having a proximal magnet so that the magnets couple to retain the brush portion and distal cap together.

6. The brush of claim 1, wherein the at least one upstanding standoff limits rotational travel by banking between two radial fins separated from each other by $\pi/2$ radians with respect to the tube portion.

7. The brush of claim 1, wherein the brush portion snaps onto the inner body and is rotational relative to the inner body.

8. A grooming device comprising:

an inner body having: a tube portion with outer proximal threads, the tube portion defining a proximal opening for filling the tube portion with a cleansing powder; and an enclosed bottom having a central guide tooth receptacle and defining at least one pair of detent depressions and a plurality of discharge holes;

a proximal cover for enclosing the proximal opening, the proximal cover including a handle and inner threads for coupling to the outer proximal threads of the tube portion; and a plate with: a central guide tooth, at least one locating rib, and a plurality of bristles, the plate defining a plurality of dispensing holes; and an upstanding collar configured to secure the plate against the enclosed bottom of the inner body, wherein the central guide tooth fits into the central guide tooth receptacle to allow and guide rotation of the plate with respect to the inner body so that:

in a closed position, the at least one locating rib is in a first detent of the at least one pair of detent depressions and the plurality of discharge and dispensing holes are not aligned so that the cleansing powder is retained in the inner body; and in an open position, the at least one locating rib is in a second detent of the at least one pair of detent depressions and the plurality of discharge and dispensing holes are aligned so that the cleansing powder passes into the plurality of bristles.

9. The grooming device of claim 8, wherein the plate further has at least one upstanding standoff, and the inner body further has an outer distal flange and outer distal radial fins extending between the tube portion and outer distal flange.

10. The grooming device of claim 9, wherein the at least one upstanding standoff limits rotational travel by banking between the radial fins.

11. The grooming device of claim 10, wherein the at least one upstanding standoff limits rotational travel by banking between two radial fins separated from each other by $\pi/2$ radians with respect to the tube portion.

12. The grooming device of claim 8, further comprising a distal cap for selectively coupling to the brush portion, wherein the plate includes a distal magnet and the distal cap includes post having a proximal magnet so that the magnets couple to retain the plate and distal cap together.

13. The grooming device of claim 8, wherein the plate snaps onto the inner body and is rotational relative to the inner body.

14. A grooming device comprising:

a proximate cover having a handle;

an inner body having a tube portion with outer proximal threads, an outer distal flange, and outer distal radial fins extending between the tube portion and the outer distal flange, the tube portion defining a proximal opening for filling the tube portion with a cleansing compound; and an enclosed bottom having a central guide tooth receptacle; the inner body configured to be removably attached to the proximate cover, the inner body having at least one standoff and defining at least one discharge hole; and a brush portion configured to snap on to the inner body and rotate about the inner body, the brush portion having: a central guide tooth, a plurality of projections and at least one dispensing hole creating a passage through the brush, the at least one standoff limits a rotation of the brush portion around the inner body; and wherein the central guide tooth fits into the central guide tooth receptacle to allow and guide rotation of the brush portion with respect to the inner body so that:

when the grooming device is in an open position, the at least one discharge hole overlaps with the at least one dispense hole, and when the grooming device is in a closed position, the at least one discharge hole does not overlap with the at least one dispense hole.

15. The grooming device of claim 14, wherein the inner body has at least one pair of detent depressions, and the brush further has at least one locating rib.

16. The grooming device of claim 15, wherein in the closed position, the at least one locating rib is in a first detent of the at least one pair of detent depressions.

17. The grooming device of claim 15, wherein in the open position, the at least one locating rib is in a second detent of the at least one pair of detent depressions.

18. The grooming device of claim 14, further comprising a distal cap for selectively coupling to the brush portion, wherein the brush portion includes a distal magnet and the distal cap includes post having a proximal magnet so that the magnets couple to retain the brush portion and distal cap together.

19. The grooming device of claim 14, wherein the brush portion snaps onto the inner body and is rotational relative to the inner body.

\* \* \* \* \*